April 1, 1930. G. W. McCONNELL 1,752,682
ROLLER ATTACHMENT
Filed Feb. 9, 1923 2 Sheets-Sheet 1

April 1, 1930.　　　G. W. McCONNELL　　　1,752,682
ROLLER ATTACHMENT
Filed Feb. 9, 1923　　　2 Sheets-Sheet 2

Inventor
Grant W. McConnell

Patented Apr. 1, 1930

1,752,682

UNITED STATES PATENT OFFICE

GRANT W. McCONNELL, OF DORSET, OHIO

ROLLER ATTACHMENT

Application filed February 9, 1923. Serial No. 618,107.

This application is a continuation in part, of my prior application Ser. No. 542,178 filed Mar. 8, 1922.

The objects of this invention are to provide simple and efficient means for attaching a metal roller to the traction wheels of a Fordson or other tractor, in which the traction wheels are provided with traction flanges.

The attached rollers must be of such dimensions as to be readily placed upon these wheels, and the attaching means must be positive to prevent possible displacement of the rollers when subjected to rough usage, and must be adjustable for alignment, so that the front and rear wheels will cover substantially the same track, and the space between the tracks must be of such a width that the return path of the machine will cover the space unpressed by the rollers in the first or advance movement thereof.

The method of spacing the rollers has the further advantage that the machine is more easily steered in the manner of a sectional roller, since one of the rollers in the rear will have comparatively little movement, while the others will be moving more quickly and in a large arc of a circle.

The invention comprises tubular rollers, adapted to have their inner extremities sleeved over the traction wheels of the tractor, and means for detachably securing them in place, so that they can be readily attached when needed, and removed when the tractor is to be otherwise employed.

It comprises combined wedging and clamping means, cooperating with the rims and flanges of the wheels, to positively retain the rollers in place, and also bracing means constructed and arranged to support the outer extremities of the rollers and retain them all in parallel relation to each other, and to their several axes.

The invention is hereinafter more fully described, illustrated in the accompanying drawings, and specifically pointed out in the claims.

Figure 1:
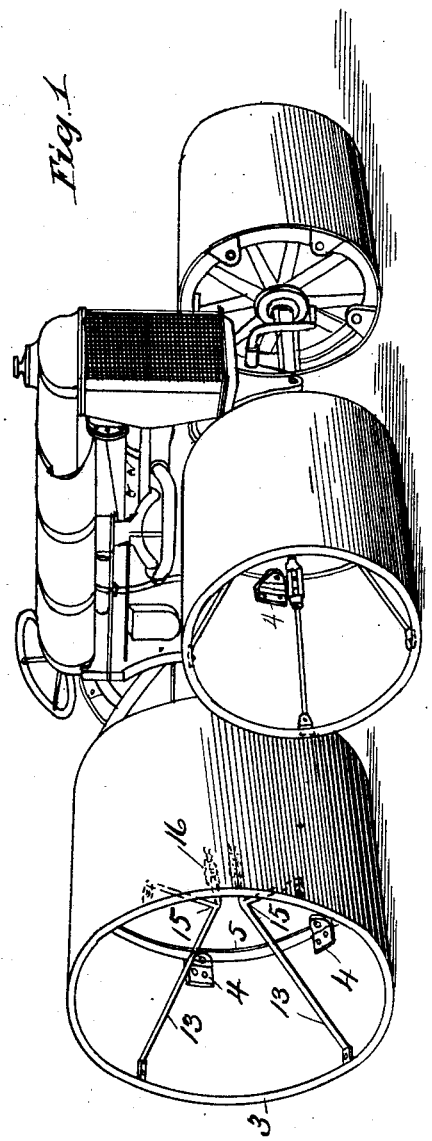
Figure 2:
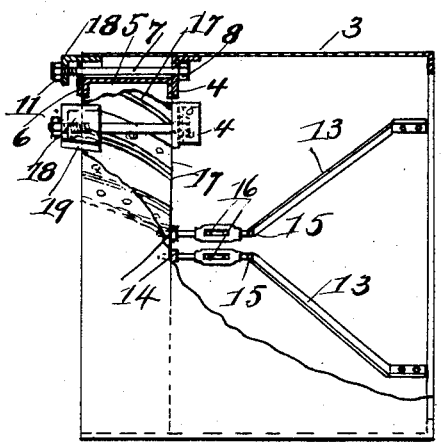
Figure 3:
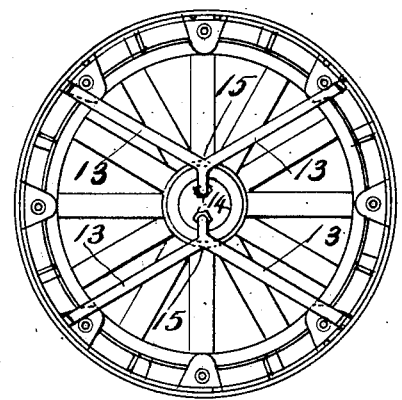
Figure 4:
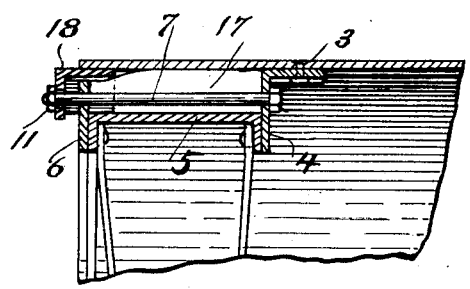
Figure 5:
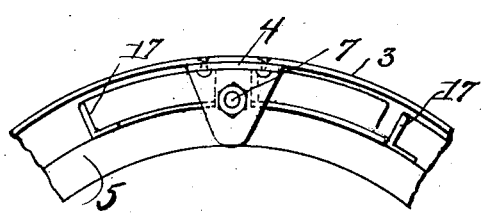
Figure 6:
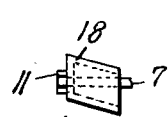
Figure 7:
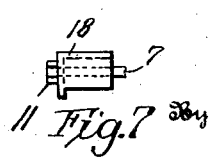

In the accompanying drawings, Fig. 1 is a perspective of the completed tractor; Fig. 2 is a view showing a transverse section through the rim of a tractor wheel, a roller thereon and its securing means, and also showing a portion of the roller broken away to expose a portion of the wheel periphery and a pair of roller securing lugs; Fig. 3 is a side elevation thereof; Fig. 4 is an enlargement of a portion of Fig. 2; Fig. 5 is a fragmentary side elevational view of a portion of the wheel rim and roller. Fig. 6 is a plan of the locking wedge, and Fig. 7 is a side elevation thereof.

In Figs. 2, 3, 4 and 5 the device is shown in detail.

Here the channel rim 5 of the wheel is clamped between the spaced angle lugs 4, secured to the inner surface of the roller 3, and a complementary clamping ring 6 upon the outer side of the roller.

Wedges 18 extend between said channel rim and roller 3 and bolts 7, 7 which pass through the wedges 18, ring 6, and lugs 4, secure the clamping members in place, and are fastened by means of nuts 11.

These wedges are provided with radially extending lugs through which the bolts pass.

These wedges straddle over the spirally positioned cleats 17 upon the periphery of the tractor wheel rim, and the sides of the wedges are correspondingly inclined with the cleats to enable the wedges to pass over the cleats.

Brace rods 13 are riveted at their outer ends adjacent to the outer edges of the roller and are joined in pairs at their inner ends at 15 each pair terminating in a straight wrist portion which is inserted in the hub or hub cup of the wheel at 14, 14.

These brace rods are longitudinally adjusted by means of turn buckles 16 which permit the roller to be placed in exact parallel relation to the other rollers and to the axis of the wheel upon which it is placed.

Having described the invention, what I claim as new and desire to secure by Letters Patent is:

1. The combination with the rim of a traction wheel and a tubular roller, sleeved thereover, of angular lugs spaced upon the inner face of said roller and extending parallel to the outer sides of said rim, complementary clamping means upon the inner edge of said rim, bolts passing through said lugs, and wedges inserted between said roller and said rim, said wedges provided with radial lugs through which said bolts pass, and securing nuts for said bolts, said wheel provided with diagonal cleats or flanges upon its outer face, said wedges being provided with channelled recesses adapted to straddle over said cleats.

2. The combination with the rim of a traction wheel and a tubular roller sleeved thereover, said rim provided with projecting cleats on its outer periphery, of spaced angular lugs secured to the inner surface of said roller against which one edge of said rim rests, clamping means upon the other side of said rim, wedge members inserted between said cleats and roller, said wedge members saddled over said projecting cleats, and bolts passing through said lugs, clamping means and wedges.

3. In a traction wheel, a hub and a wheel rim, and a hollow cylindrical roller sleever over said rim, means for attaching said rim and roller together, said roller extending transversely beyond said rim, and brace rods secured to said roller adjacent to its outer end and to the hub of said wheel, said brace rods being divided intermediate their ends, and turn buckles adjustably connecting the divisions in each brace rod.

In testimony whereof, I hereunto set my hand this 27th day of February 1924.

GRANT W. McCONNELL.